March 20, 1956
C. FERGUSON
2,739,112
DECOATING PROCESS
Filed April 8, 1952
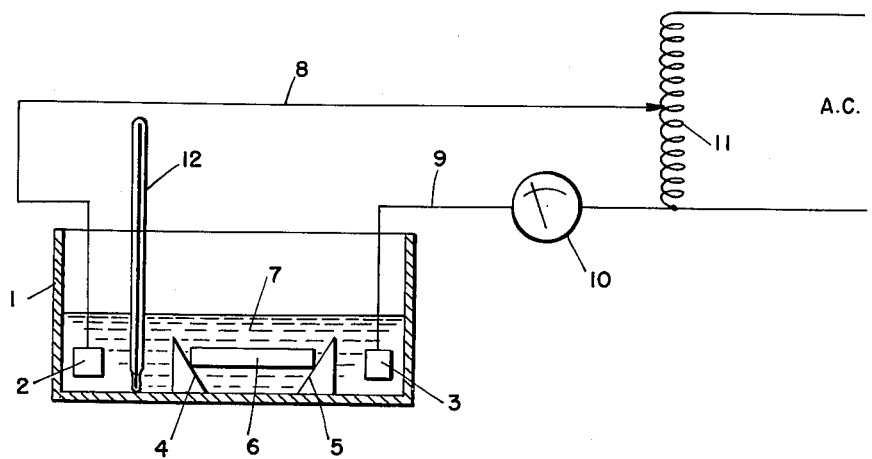
INVENTOR.
CARL FERGUSON
BY
ATT'YS.

United States Patent Office 2,739,112
Patented Mar. 20, 1956

2,739,112

DECOATING PROCESS

Carl Ferguson, Indianapolis, Ind.

Application April 8, 1952, Serial No. 281,255

3 Claims. (Cl. 204—130)

(Granted under Title 35, U. S. Code (1952), sec. 266)

This invention relates, in general, to a process for decoating or removing the surface film on various materials and, more particularly, relates to an electroionic process for removing fine films of optical coatings such as magnesium fluoride, sodium aluminum fluoride, quartz, titanium dioxide, etc. from surfaces of glass, plastics, and other non-conducting materials, and particularly those materials used for optical elements.

In the optical industry, it is frequently necessary to clean the surfaces of the lenses in order to apply a uniform and durable film of a reflection reducing material. Also when it is desired to reclaim old lenses, it is necessary to remove the existent coating in the most expedient and economical manner. Up to the time of the instant invention, the removal of such coatings as magnesium fluoride, and even such metals as chromium and rhodium, were very difficult, and heretofore it was usually necessary to grind off the film in order to effectively salvage used optical lenses and the like, which were coated with such films. Prior chemical processes for removing such films were time consuming and often resulted in pitting of the lenses and other undesirable conditions.

The invention provides a very quick, easy, and economical method for removing high temperature baked films from a surface of glass or other nonconducting base material which baking point has been below the fusing temperature of the base material and the base material remained below its incipient melting point during the application of the film.

Accordingly, one object of the invention is to provide a decoating process for promoting salvage and reclaiming all types of optical elements in a more expedient and economical manner.

A further object of the invention is to provide a process for removing optical coatings from nonconducting base materials which is more effective and takes less time than any existing process.

Still another object of the invention is to provide a novel chemical process for decoating electrically conductive or nonconductive films from nonconducting base materials without pitting the base material or causing the emission of obnoxious gases.

One feature of the instant invention is to remove an optical coating from the surface of a nonconductive element by means of a process which includes the steps of submerging the optical element in an electrolyte and passing an electric current through the electrolyte.

A further feature of the invention, which greatly increases the decoating action, is to utilize alternating current rather than direct current through the electrolyte.

A still further feature of the invention is to utilize a weak acid for the electrolyte. Other features and objects will become apparent upon reference to the specifications and the accompanying drawing which shows the apparatus for performing the process of the invention.

The utilization of an electroionic process including the passage of current through an electrolyte to clean or remove material from the surface of metal articles is old and well known, as shown in U. S. Patents 2,480,845 and 1,098,338, and British Patent 467,024 (1936). The process disclosed by these patents required that the base material, of which the surface was to be cleaned, be made of an electrically conductive material, such as metal, where the metal, either directly or indirectly, was an electrode of an electrolytic cell. Also, neither the above patents nor the optical industry has previously recognized that electrolytic action could be used to remove hard and tenacious films, such as magnesium fluoride, sodium aluminum fluoride, quartz, titanium dioxide, and like coatings.

This invention has, for the first time, provided a process which in a few minutes will remove a coating, such as magnesium fluoride, from nonconducting materials without pitting the base materials and without resulting in the formation of obnoxious and poisonous gases.

One of the existing chemical processes for removing such coatings comprised the submersion of the material to be decoated in such chemicals as concentrated sulfuric acid or boric acid where the temperature of the bath is raised to 130° C., or a process which utilized melted crystals of potassium bisulphate heated to a temperature of at least 250° C. resulting in danger to personnel from the boiling solutions, acidic fumes, and the danger of damage or breakage of the elements by pitting. These processes also suffer from the disadvantage that a relatively long time was necessary for removal of the coatings or that the coatings could not be effectively removed at all by these prior processes, and the coated elements had to be either discarded or reground in order to salvage them.

Reference should now be made to the drawing which shows one exemplary apparatus for performing the process comprising the invention.

The apparatus there shown comprises a container 1 having an electrolyte 7 therein, electrodes 2 and 3 submerged in the electrolyte 7, and a voltage circuit coupled to the electrodes 2 and 3 by conductors 8 and 9 which include a current indicating meter 10 in series with variable transformer (variac) 11, the input of which is connected to an alternating current voltage supply source. The material to be decoated is submerged in the electrolyte thereof. If desired, the coated material 6 is supported by inclined supports 4 and 5 which provide a free space below the material to be decoated so that the process may react on all of the surfaces of coated material 6. A thermometer 12 may be inserted in the electrolyte 7 to indicate the temperature thereof so that the voltage and the strength of the electrolyte can be adjusted to proper magnitudes so that the temperature cannot become too high to damage the coated material 6. The electrolyte 7 may consist of a weak solution of an acid, as for example, hydrochloric or sulfuric acid and also may include chloride, sulfate, and nitrate salt solutions, inorganic base solutions, and other electrolytes. The use of a weak acid is preferred, however, since the acid results in a faster acting process which is free of pitting and obnoxious gases. A concentrated acid solution may result in a high temperature solution which results in pitting of the base material and in the formation of obnoxious acid fumes. It has been found that a weak electrolyte solution containing not more than approximately 5 per cent of a material selected from the group consisting of strongly ionizing acids, bases, and salts is very satisfactory and suitable for the reasons that it greatly reduces the possibilities of pitting the optical elements and eliminates the safety hazards to operating personnel of obnoxious gases and of dangers from contact with strong reagents.

It should be understood that the value and kind (A. C. or D. C.) of the current passing through the electrolyte, the size of the electrodes, the concentration of the electrolyte, and the spacing of the electrodes are not critical factors; and a wide variation of values of the above may be used. However, in any particular case depending upon the thickness of the films to be used and the material which is coated, a particular value of current and a particular concentration of electrolyte would produce the best results.

In order to readily appreciate the breadth and scope of the invention, the following are examples of the specific conditions and materials with which the process was found operative. It should be understood that numerous other examples could be given and the invention is not limited to the specific values given by the examples.

*Example 1*

Electrolyte 7:
  Water: 600 cc.
  Chemical in solution: concentrated sulfuric acid 30 cc.
  Temperature of electrolyte: 150° F.
Electrodes 2–3:
  Separation: 3″
  Material: copper electrodes—1½″ x 3″ x ¼″
Article 6:
  Base material: ordinary crown glass—2″ x 2″ x ¼″
  Coating: magnesium fluoride of $4 \times 10^{-6}$ inches
  Position: midway between electrodes
Current: 5 amp.
Voltage: 10 volts
Time of removal: 8 minutes
Condition of article after decoating: clean, smooth surface free of magnesium fluoride film

*Example 2*

Electrolyte 7:
  Water: 600 cc.
  Chemical in solution: concentrated sulfuric acid 30 cc.
  Temperature of electrolyte: 160° F.
Electrodes 2–3:
  Separation: 3″
  Material: copper electrodes—1½″ x 3″ x ¼″
Article 6:
  Base material: ordinary crown glass—2″ x 2″ x ¼″
  Coating: quartz of $4 \times 10^{-6}$ inches thickness
  Position: midway between electrodes
Current: 5 amp.
Voltage: 10 volts
Time of removal: 8 minutes
Condition of article after decoating: clean, smooth surface free of quartz film

*Example 3*

Electrolyte 7:
  Water: 600 cc.
  Chemical in solution: concentrated sulfuric acid 30 cc.
  Temperature of electrolyte: 150° F.
Electrodes 2–3:
  Separation: 3″
  Material: copper electrodes—1½″ x 3″ x ¼″
Article 6:
  Base material: ordinary crown glass—2″ x 2″ x ¼″
  Coating: sodium aluminum fluoride of $4 \times 10^{-6}$ inches thickness
  Position: midway between electrodes
Current: 5 amp.
Voltage: 10 volts
Time of removal: 3 minutes
Condition of article after decoating: clean, smooth surface free of sodium aluminum fluoride film

*Example 4*

Electrolyte 7:
  Water: 600 cc.
  Chemical in solution: concentrated sulfuric acid 30 cc.
  Temperature of electrolyte: 150° F.
Electrodes 2–3:
  Separation: 3″
  Material: copper electrodes—1½″ x 3″ x ¼″
Article 6:
  Base material: ordinary crown glass—2″ x 2″ x ¼″
  Coating: zinc sulphide of $4 \times 10^{-6}$ inches thickness
  Position: midway between electrodes
Current: 5 amp.
Voltage: 10 volts
Time of removal: 3 minutes
Condition of article after decoating: clean, smooth surface free of zinc sulphide film

*Example 5*

Electrolyte 7:
  Water: 600 cc.
  Chemical in solution: sodium chloride 30 grams
  Temperature in electrolyte: 160° F.
Electrodes 2–3:
  Separation: 3″
  Material: copper electrodes—1½″ x 3″ x ¼″
Article 6:
  Base material: ordinary crown glass—2″ x 2″ x ¼″
  Coating: magnesium fluoride of $4 \times 10^{-6}$ inches thickness
  Position: midway between electrodes
Current: 5 amp.
Voltage: 10 volts
Condition of article after decoating: clean, smooth surface free of magnesium fluoride
Time of removal: 20 minutes

*Example 6*

Electrolyte 7:
  Water: 600 cc.
  Chemical in solution: sodium hydroxide 30 grams
  Temperature of electrolyte: 150° F.
Electrodes 2–3:
  Separation: 3″
  Material: copper electrodes—1½″ x 3″ x ¼″
Article 6:
  Base material: ordinary crown glass—2″ x 2″ x ¼″
  Coating: magnesium fluoride of $4 \times 10^{-6}$ inches thickness
  Position: midway between electrodes
Current: 5 amp.
Voltage: 10 volts
Time of removal: 8 minutes
Condition of article after decoating: clean, free of magnesium fluoride film

*Example 7*

Electrolyte 7:
  Water: 600 cc.
  Chemical in solution: concentrated sulfuric acid 30 cc.
  Temperature of electrolyte: 170° F.
Electrodes 2–3:
  Separation: 3″
  Material: copper electrodes—1½″ x 3″ x ¼″
Article 6:
  Base material: ordinary crown glass—2″ x 2″ x ¼″
  Coating: magnesium fluoride of $4 \times 10^{-6}$ inches thickness
  Position: midway between electrodes
Current: 15 amp.
Voltage: 20 volts
Time of removal: 6 minutes
Condition of article after decoating: clean, smooth surface free of magnesium fluoride film

*Example 8*

Electrolyte 7:
  Water: 600 cc.
  Chemical in solution: concentrated sulfuric acid 30 cc.
  Temperature of electrolyte: 180° F.

Electrodes 2-3:
  Separation: 3"
  Material: copper electrodes—1½" x 3" x ¼"
Article 6:
  Base material: ordinary crown glass—2" x 2" x ¼"
  Coating: magnesium fluoride of $4\times10^{-6}$ inches thickness
  Position: midway between electrodes
Current: 15 amp.
Voltage: 20 volts
Time of removal: 30 minutes
Condition of article after decoating: clean, smooth surface free of magnesium fluoride film

*Example 9*

Electrolyte 7:
  Water: 600 cc.
  Chemical in solution: concentrated sulfuric acid 30 cc.
  Temperature of electrolyte: 150° F.
Electrodes 2-3:
  Separation: 3"
  Material: copper electrodes—1½" x 3" x ¼"
Article 6:
  Base material: ordinary window glass
  Coating: varnish (phenolic base) of $4\times10^{-6}$ inches thickness
  Position: midway between electrodes
Current: 5 amp.
Voltage: 10 volts
Time of removal: 6 minutes
Condition of article after decoating: clean, free of varnish film

*Example 10*

Electrolyte 7:
  Water: 1200 cc.
  Chemical in solution: concentrated sulfuric acid 60 cc.
  Temperature of electrolyte: 150° F.
Electrodes 2-3:
  Separation: 6"
  Material copper electrodes—1½" x 3" x ¼"
Article 6:
  Base material: ordinary crown glass
  Coating: magnesium fluoride of $4\times10^{-6}$ inches thickness
  Position: midway between electrodes
Current: 10 amp.
Voltage: 15 volts
Time of removal: 8 minutes
Condition of article after decoating: clean, smooth surface free of magnesium fluoride film

*Example 11*

Electrolyte 7:
  Water: 600 cc.
  Chemical in solution: concentrated sulfuric acid 30 cc.
  Temperature of electrolyte: 150° F.
Electrodes 2-3:
  Separation: 3"
  Material: copper electrodes—1½ x 3" x ¼"
Article 6:
  Base material: ordinary crown glass—2" x 2" x ¼"
  Coating: magnesium fluoride of $4\times10^{-6}$ inches thickness
  Position: behind one electrode
Current: 5 amp.
Voltage: 10 volts
Time of removal: 8 minutes
Condition of article after decoating: clean, smooth surface free of magnesium fluoride film

*Example 12*

Electrolyte 7:
  Water: 600 cc.
  Chemical in solution: concentrated sulfuric acid 30 cc.
  Temperature of electrolyte: 150° F.
Electrodes 2-3:
  Separation: 3"
  Material: copper electrode—6" x 1" x ⅛"
Article 6:
  Base material: crown glass—2" x 2" x ¼"
  Coating: chromium and rhodium of .0001 inch thickness
  Position: between electrodes
Current: 5 amp.
Voltage: 10 volts
Time of removal: 3 minutes
Condition of article after decoating: clean, smooth, unetched As shown by the above examples, the electrolyte can be an acid, base, or a salt, although acid is preferred. Likewise, either alternating or direct current may be used, although alternating current is preferred. Whether the material to be decoated is between the electrodes or behind one of the electrodes (not between them) is of little consequence. The films of the examples are representative of metallic and non-metallic coatings having the common chemical and physical characteristics of providing reflective and reflection reducing qualities.

Further experiments performed both with acid and salt electrolytes indicate that weak solutions of either electrolyte produce the quickest and most effective results. For example, keeping the applied voltage and other factors constant, the process of this invention removes rhodium from crown glass in 7, 11, and 30 minutes where the respective electrolytes were a 5–10–15 per cent solution of salt (sodium chloride).

A 5 per cent acid solution removed the rhodium in 3 minutes showing the superiority of a weak acid electrolyte over a weak salt electrolyte.

In production work, a large number of objects may be decoated simultaneously by increasing the size of the tank, electrodes, and the amount of electrolyte in proportion to the work to be done. Usually a higher current density and voltage are required when using D. C. than when A. C. is used. By using A. C., polarization of the electrodes is avoided which slows the process when D. C. is used.

This process will also remove surface stains resulting from exposure to the weather and various other causes from the surfaces of glass or plastics. Coatings can be removed from cemented acromatic lenses and lens-prism combinations, without damage to the cementing medium and without separation of the parts. The reflectivity and light transmission qualities of the surfaces or elements is not impaired by this process.

The apparatus described for carrying out this process and the applications of the process should be regarded by way of illustration and example and not as a limitation or restriction of the invention, as many changes may be made in carrying out the process without departing from the spirit and scope of the invention.

The invention described herein may be manufactured and used by or for the Government of the United States of America for governmental purposes without the payment of any royalties thereon or therefor.

This application is a continuation-in-part of application, Serial No. 5,473, filed January 30, 1948, by Carl Ferguson for Decoating Process, now abandoned.

I claim:
1. The electroionic process of removing very thin applied reflective and reflection reducing films from optical surfaces of optical glass bodies without visibly marring the surfaces, said films consisting of materials from the group of metallic and non-metallic materials having the common chemical and physical characteristics to provide suitable reflective and reflection reducing films for optical bodies, said process consisting of adding not more than approximately 5 per cent of a material selected from the group consisting of strongly ionizing acids, bases, and salts to an aqueous bath in sufficient quantity to make the bath electrically conductive and in insufficient quantity to microscopically etch said glass body during said process, then placing said optical glass body with said film in said bath, then placing electrodes, disassociated from said body, in said bath, and finally applying a voltage by spaced electrodes to the bath of sufficient potential until said film disassociates and leaves the surface of said body without glass etching.

2. The electroionic process of removing very thin optical films from optical surfaces of optical glass bodies, the films consisting of materials selected from the group consisting of magnesium fluoride, quartz, sodium aluminum fluoride, zinc sulphide, chromium and rhodium, said process consisting of adding about 30 cc. of concentrated sulfuric acid to about 600 cc. of water at room temperature, placing spaced electrodes in said solution, placing at random said optical bodies with films of materials selected from said group in said solution, and then passing current between said electrodes for a period of time between about 3 minutes and 8 minutes and until said film loosens from said body, the current density being high enough to loosen said film and low enough to not etch said glass body.

3. The process of removing very thin reflective and reflection reducing optical films from optical surfaces of nonconducting bodies without pitting the optical surface of said bodies, the films being of materials selected from the group consisting of magnesium fluoride, quartz, sodium aluminum fluoride, zinc sulphide, phenolic base varnish, chromium, and rhodium, said process consisting of submerging said bodies with the reflective films in an aqueous bath containing an electrolyte produced from approximately 5 per cent of one of the materials of the group consisting of sulphuric acid, sodium chloride, and sodium hydroxide, said electrolyte being of insufficient strength to chemically react with the material of said bodies underlying said films, applying a voltage between two points spaced from said bodies in said bath, limiting the amplitude of current between said points and the duration of said current to limit the temperature of the bath to less than abou 150 degrees Fahrenheit, and continuing the application of voltage until said film dislodges from said optical surfaces.

References Cited in the file of this patent

UNITED STATES PATENTS

| | | |
|---|---|---|
| 736,669 | Zoeller | Aug. 18, 1903 |
| 1,917,039 | Klein et al. | July 4, 1933 |
| 1,966,817 | Haux | July 17, 1934 |
| 2,600,107 | Gelfand et al. | June 10, 1952 |